INVENTOR.
CHARLES C. CHRISTENSEN
JOHN D. PRATER
BY

ATTORNEYS

INVENTOR.
CHARLES C. CHRISTENSEN
JOHN D. PRATER

United States Patent Office 2,945,742
Patented July 19, 1960

2,945,742

LIQUID-LIQUID EXTRACTION PROCESS FOR THE RECOVERY OF HIGH PURITY THORIUM OXIDE

Charles C. Christensen and John D. Prater, Salt Lake City, Utah, assignors to Kennecott Copper Corporation, New York, N.Y., a corporation of New York Filed May 16, 1958, Ser. No. 735,735

11 Claims. (Cl. 23—14.5)

This invention relates to a process for recovering a high purity thorium oxide from a thorium-bearing, aqueous solution, and, in particular, to a process for separating thorium in a highly purified state from leach liquor by means of liquid-liquid solvent extraction followed by solvent stripping.

In recent years, considerable interest has developed in the use of thorium as a fuel for the so-called "breeder" type, nuclear power reactor. In this type of reactor, thorium is converted into a fissionable form of uranium capable of acting as a nuclear fuel. Normal thorium (Th-232) does not exhibit fissionable properties, but when it is bombarded with neutrons it yields a product that undergoes spontaneous changes leading to the formation of fissionable nuclei (U-233). Since thorium is more abundant and cheaper than uranium, its attractiveness as a source of fissionable material becomes readily apparent.

A known method for producing thorium oxide comprises precipitating thorium from a solution containing a thorium salt and then calcining it to form the desired thorium oxide. However, when thorium-bearing materials contain rare earth elements, as they ordinarily do, these tend to appear as impurities in the final product. While thorium can be obtained in the form of high purity thorium fluoride, its conversion to the oxide is economically prohibitive at present because of inherent processing difficulties.

Liquid-liquid solvent extraction has excited a great deal of interest in the recovery of such fertile atomic energy materials as uranium and thorium. Broadly speaking, the method comprises mixing leach liquor with an organic solvent in which it is insoluble but in which the material to be extracted is soluble, and allowing the organic and aqueous phases to separate out by gravity. The organic solvent selectively extracts the material to be recovered from the liquor, leaving a raffinate or barren leach liquor which may be either discarded or returned to the leaching process. The extract is stripped of the extracted material by contact with a stripping solution, such as a mineral acid or other aqueous solution having a greater affinity for the extracted material than for the organic solvent. The barren organic solvent remaining from the stripping step becomes available for further leach liquor extraction, if desired, and the pregnant stripping solution containing the desired product is treated to recover the product in a purified state.

Both uranium and thorium have been successfully recovered from a nitric acid solution by liquid-liquid extraction using tributyl phosphate as the solvent. But this solvent is not effective for other more commonly used mineral acids, such as hydrochloric and sulfuric.

In the solvent recovery of uranium from leach liquors, phosphoric acid esters particularly alkyl phosphates dissolved in kerosene have been proposed and found to be quite effective. These same solutions appear to be somewhat useful in the solvent extraction of thorium, except that after the thorium is taken up by the solvent, it is difficult to strip or remove therefrom. This is because the organic solvent has a stronger affinity for thorium than has the stripping solution.

Examples of alkyl phosphates having a relatively high affinity for thorium when diluted with kerosene are monotridecylorthophosphoric acid, 2,6,8-trimethylnonylphosphoric acid-2, and monoheptadecylorthophosphoric acid (also referred to as HDPA). However, because of the difficulty of stripping the thorium from these solvents, they have not heretofore been successfully employed in connection with the production of thorium oxide.

We have now discovered that phosphoric acid esters, such as the aforementioned, can be used in the solvent extraction of thorium oxide from thorium-containing solutions and the thorium effectively stripped therefrom, provided that a relatively small quantity of tributyl phosphate (TBP) or the like is incorporated in the solvent to alter its properties. In addition, it is necessary to employ a special stripping procedure, as herein disclosed.

Principal objects of the invention are to provide a process for producing thorium oxide of high purity; to provide a liquid-liquid extraction technique for removing and recovering thorium from various acid leach liquors containing same; to remove impurities from the thorium-bearing, solvent extract solution prior to stripping the thorium therefrom; and to provide an effective stripping procedure for removing thorium from a phosphoric acid ester solvent.

In the accomplishment of these objects, features of the invention are the utilization, as the solvent extractant, of a phosphoric acid ester conditioned by the addition of tributyl phosphate or the like, and the employment of a special two-step, acid and basic, stripping procedure for removing the thorium from the solvent extract solution.

These and other objects and features of the invention will be more fully understood in connection with the detailed description of preferred specific practice outlined in the accompanying drawings, wherein.

Figure 1:
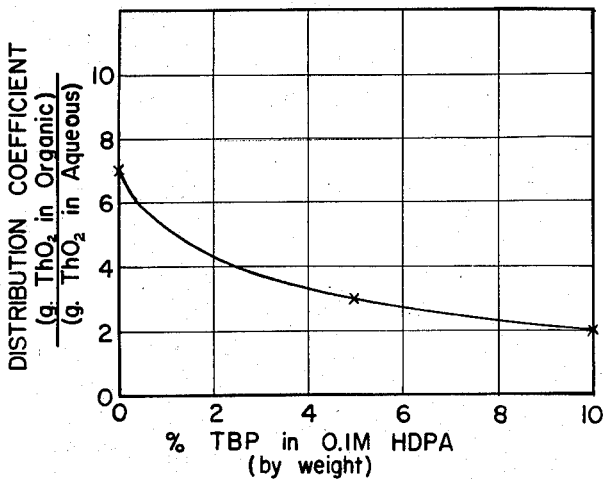
Fig. 1 is a graph showing the effect, on thorium extraction, of the addition of tributyl phosphate to a solvent comprising a phosphoric acid ester solution.

The process provided by the invention involves extracting thorium from leach liquor by utilizing a phosphoric acid ester dissolved in an organic carrier and containing relatively small, controlled amounts of tributyl phosphate (TBP) or the like as a special conditioning agent to render the solvent strippable of contained values. If this agent is not incorporated in the solvent, only about 50% of the thorium can be stripped therefrom. For economic reasons, a cyclic process is desired, and, unless the solvent can be easily regenerated by an effective stripping procedure, it is of little use in the cycle.

Tributyl phosphate, by itself, has practically no affinity for thorium in hydrochloric or sulfuric acid solutions, and is, therefore, not useful as an extractant where such acids have been used for leaching thorium from its source materials. In comparing various organic solutions as possible solvents for such a leach solution, thorium recovery was attempted from a 6 N HCl solution containing about 5 grams of $ThO_2$/liter, 25 grams Fe/liter, 2 grams $TiO_2$/liter, 0.2 gram rare earth oxides/liter, and 0.1 gram $U_3O_8$/liter. Equal amounts of the thorium-bearing acid solution and the solvent were shaken in a separatory funnel, the phases allowed to separate, and the amount of thorium in the solvent layer determined by X-ray fluorescence analysis. The results are given as follows:

TABLE 1

| Solvent | Carrier | Thorium Extracted |
|---|---|---|
| Tributyl phosphate | None | No. |
| Methylisobutyl ketone | do | No. |
| 5-ethylnonylortho-phosphoric acid-2 | Kerosene | Yes. |
| Monotridecylortho-phosphoric acid | do | Yes. |
| 2,6,8-trimethylnonyl-orthophosphoric acid-2 | do | Yes. |
| Monoheptadecylortho-phosphoric acid | do | Yes. |

The entire group of phosphoric acid esters tried showed good thorium extraction. Monoheptadecylorthophosphoric acid (HDPA) appears to be the best for the purpose, because of its physical qualities, particularly its lesser tendency to form stable emulsions in both the extraction and the stripping operations and its lesser solubility in sodium carbonate. When dissolved in kerosene, it is preferably employed in amounts ranging from about 0.1 to 0.7 M or 33.6 to 234 grams per liter.

In a liquid-liquid extraction test using an hydrochloric acid solution containing about 4 grams/liter of $ThO_2$ and a solvent of 0.1 molar HDPA in equal volumetric ratios, 3.5 grams/liter of $ThO_2$ were extracted for hydrochloric acid concentrations ranging from 10 to about 450 grams/liter. For sulfuric acid solutions under the same conditions, 2.5 grams/liter were extracted over acid concentrations of about 10 to just over 500 grams/liter. However, the solvent exhibited poor stripping properties in both instances.

In an investigation of various stripping solutions, samples of HPDA solvent containing thorium were treated, with the following results:

TABLE 2

| Stripping Solution | Results |
|---|---|
| HF | Complete Stripping. |
| HCl (11.9 g./l.-431 g./l.) | No Stripping. |
| $HNO_3$ (100 g./l.-700 g./l.) | No Stripping (higher concentrations oxidize solvent). |
| $H_2SO_4$ (pH 1-90 g./l.) | No Stripping. |
| $H_2SO_4$ (180 g./l.-1,350 g./l.) | Partial Stripping (25%). |
| $H_2SO_4$ (greater than 1,350 g./l.) | Decomposes Solvent. |
| 2 M NaCl, $H_2SO_4$ (18 g./l.-360 g./l.) | Partial Stripping (25%). |
| 1 M $(NH_4)_2SO_4$, $H_2SO_4$ (360 g./l.) | Do. |
| 1 M $Na_2SO_4$, $H_2SO_4$ (360 g./l.) | Do. |
| Oxalic Acid, $H_2SO_4$ (1,260 g./l.) | Do. |
| NaOH (50 g./l.) | No Stripping. |
| $Na_2CO_3$ (25, 50 and 100 g./l.) | Partial Stripping (25%). |
| $Na_2CO_3$ (25 g./l.)-$NaHCO_3$ (25 g./l.) | Do. |
| $Na_2CO_3$, NaCl | Do. |
| $Na_2CO_3$, $(NH_4)_2SO_4$ | Do. |
| $Na_2CO_3$, sodium oxalate | Do. |

None of the foregoing procedures proved satisfactory for the commercial recovery of thorium as an oxide product. However, it was found that approximately 50% of the thorium could be stripped with an aqueous solution of $H_2SO_4$ (900 grams/liter) followed by an aqueous solution of $Na_2Co_3$ (50 grams/liter).

When tributyl phosphate (TBP) was added to the phosphoric acid ester solvent to determine its effect, it was found that, even though extraction was lessened, the properties of the ester were altered beneficially so far as stripping was concerned.

The effect of varying amounts of TBP on the thorium extraction coefficient of a 0.1 M HDPA solvent in contact with the thorium-containing HCl solutions is shown in Fig. 1. While Fig. 1 indicates that the distribution coefficient falls off with the addition of TBP to the solvent, Figs. 2 and 3 show that high over-all recovery of thorium is obtained when the TBP content of the solvent is in the neighborhood of 5% by weight.

Assuming the solvent to contain about 5% TBP, Fig. 1 shows it to have a distribution coefficient of about 3:1. This means that if the leach liquor contains 8 grams per liter of $ThO_2$ equivalent, 75% of it (i.e. 6 grams per liter) will be recovered by the first extraction. A second extraction with fresh solvent will remove 75% of the remainder (1½ grams/liter), so that, in two extractions, a total of 7½ grams/liter, of 93.75%, is recovered. Assuming that equal volumes of solvent are employed in each of the extractions and that these are combined, the resulting solution will contain about 3.75 grams/liter (7.5 divided by 2).

Figure 2:
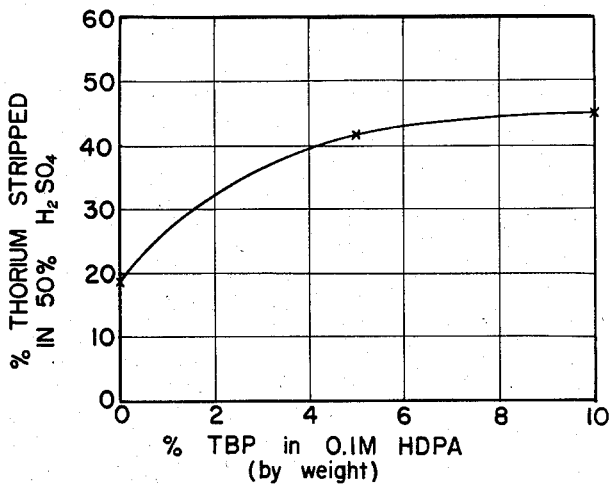
Fig. 2 is a graph showing the effect of such addition on stripping thorium from the extract solution with a sulfuric acid solution.
Figure 3:
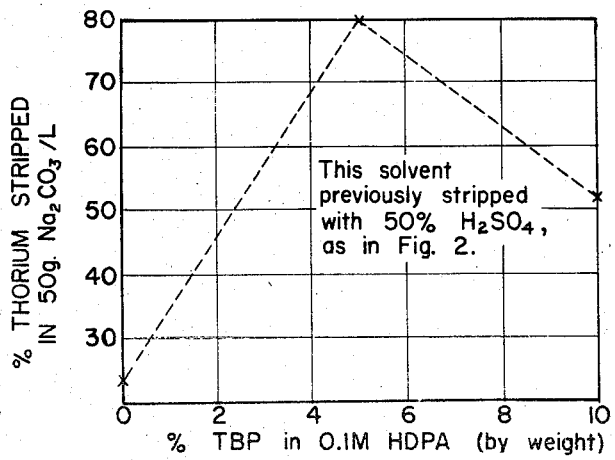
Fig. 3 is a graph showing the effect of such addition on stripping thorium from the partially stripped extract solution with an alkali metal carbonate solution.

Referring now particularly to Fig. 2, the thorium-containing extract solution was subjected to stripping with an equal volume of 50% $H_2SO_4$ (about 698 grams/liter). Since the solvent had a TBP content of 5%, 41% of the thorium oxide equivalent (or 1.54 grams/liter) was extracted, leaving 59% or about 2.21 grams/liter in the solvent. This solvent was then subjected to further stripping with an equal volume solution of $Na_2CO_3$ (Fig. 3), whereupon 80% of the remainder, or 1.77 grams/liter, was removed. Thus, the two stripping solutions together removed a total of 1.54 plus 1.77 grams/liter of $ThO_2$, or 3.31. Since the combined solvents originally contained 3.75 grams/liter of $ThO_2$, this calculates to a yield from the solvent of about 88.3%, or a total yield from the original liquor of about 82% (.883 x 93.75).

While TBP alters the distribution coefficient of the solvent, it, on the other hand, enables a high over-all recovery of the end product, when a two-stage stripping procedure, namely, mineral acid followed by carbonate, is used.

From Fig. 3, it is seen that the carbonate stripping is critical in the region of about 5% TBP, which explains why this amount is preferred.

Figure 4:
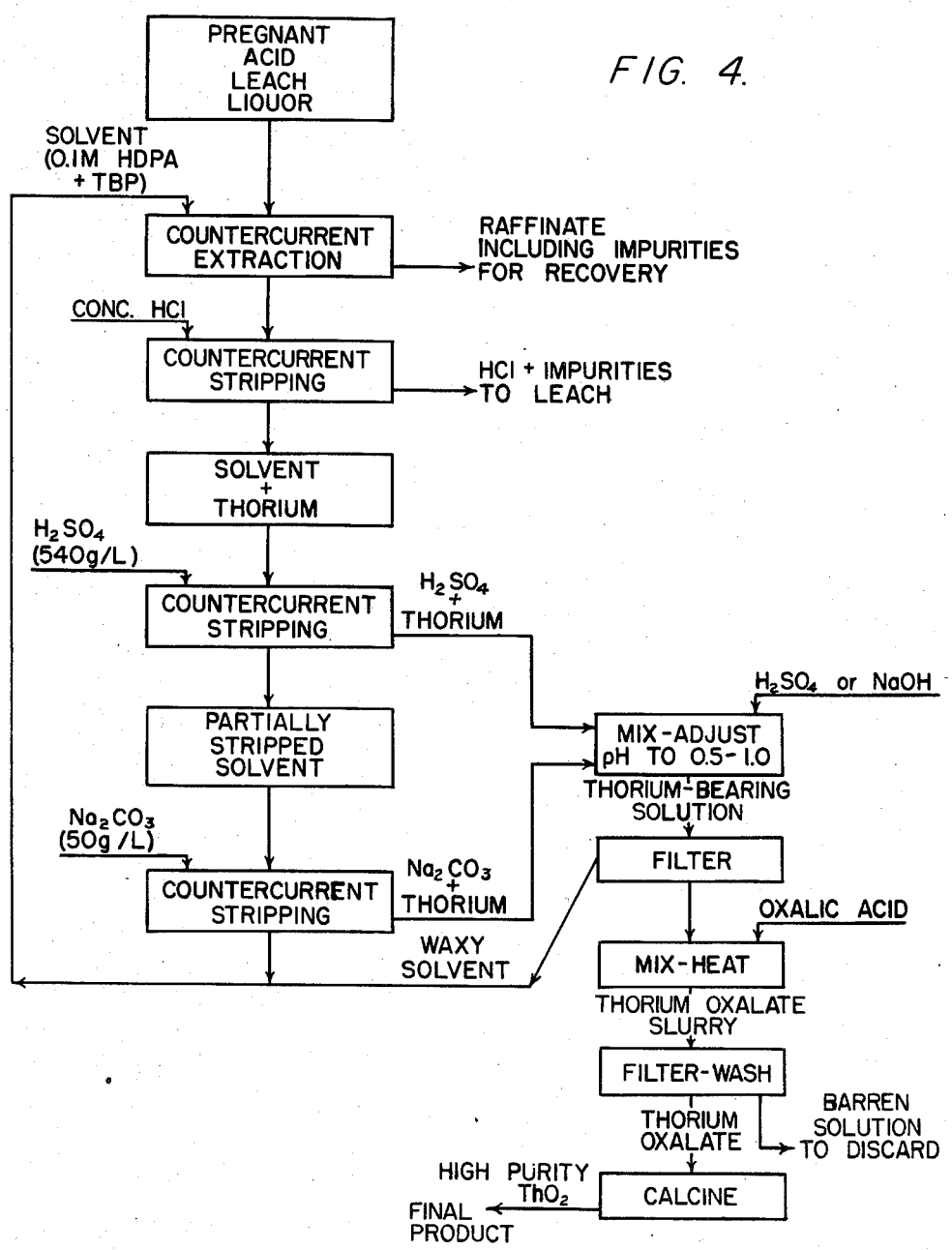
Fig. 4 is a flow sheet illustrating an optimum procedure by which the process of the invention may be put to practice to best advantage.

As illustrative of how the foregoing is utilized in the invention, attention is directed to the flow sheet of Fig. 4.

A pregnant leach liquor or heading solution of 6 N hydrochloric acid containing 4 g. $ThO_2$/liter, 1 g. $TiO_2$/liter, 0.5 g. REO (rare earth oxides)/liter, 0.2 g. $U_3O_8$/liter, and 25 g. Fe/liter, was subjected to countercurrent solvent extraction with a 0.1 M HDPA solution (kerosene) containing 5% by weight of TBP. The heading solution was extracted in four stages. The raffinate or barren liquor, which contained 0.8 g. $TiO_2$/liter, 0.09 g. $ThO_2$/liter, 0.5 g. REO/liter, 0.2 g. $U_3O_8$/liter, and 24 g. Fe/liter, was set aside for the recovery of uranium and the rare earths. The solvent, containing thorium and some impurities, was then washed countercurrently in three stages with concentrated hydrochloric acid. This was followed by a one-stage water wash.

The HCl with residual impurities was separated and sent to leach. The extract (solvent+thorium) was then subjected to partial stripping with $H_2SO_4$ (540 g./l.). Following this the partially stripped extract solution was subjected to carbonate stripping by contact with $Na_2CO_3$ (50 g./l.).

The two stripping solutions were combined, and, in order to prepare for thorium oxalate precipitation, the pH was adjusted to 0.5–1.0. A waxy solvent residue was filtered out, was combined with the stripped solvent (containing about 0.5 g. $ThO_2$/l.), and was returned therewith to the extraction step. The thorium-bearing solution which passed through the filter, as the filtrate, was heated, and a stoichiometric excess of oxalic acid added. This precipitated thorium oxalate, which was filtered and washed to remove occluded sodium, and was thereafter calcined to form $ThO_2$ of high purity.

The following table demonstrates the quantitative results obtainable on a continuous basis, using a 0.1 M HDPA in kerosene solvent containing 5% TBP:

TABLE 3

| Material | $ThO_2$, g./l. | Fe, g./l. | $TiO_2$, g./l. | REO, g./l. | $U_3O_8$, g./l. |
|---|---|---|---|---|---|
| Heading Solution (6 N HCl) | 3.9 | 25 | 1.7 | 0.5 | 0.223 |
| Raffinate 1 (solution:solvent ratio—1:1) | 1.0 | 24 | 0.8 | 0.5 | |
| Raffinate 2 (solution:solvent ratio—1:2) | 0.09 | 23 | 0.08 | 0.5 | 0.168 |
| HCl stripping solution (solution:solvent ratio—1:20) | 0.03 | 10 | 0.0 | 0.0 | 0.54 |
| Water wash (solution:solvent ratio—1:5) | 0.03 | 2.5 | 0.0 | 0.0 | 0.0 |
| Sulfuric acid (30%) strip (solution:solvent ratio—1:5) | 6 | 0.0 | 0.0 | 0.0 | 0.0 |
| Sodium carbonate (50 g./l.) strip (solution:solvent ratio—1:1) | 1.2 | 0.0 | 0.0 | 0.0 | 0.0 |
| Stripped Solvent | 0.47 | 0.0 | 0.9 | 0.0 | 0.0 |

The thorium, on subsequent recovery as thorium oxalate, yielded a product of 99.99% $ThO_2$ after calcining. Thorium recovery from the solution, under the best conditions, came to 97.5%. The stripping recovery came to 88.2%, resulting in an over-all yield from leach solution to end product of about 86%. The loss included the amount of thorium retained by the solvent after stripping. In a continuous process, the thorium would be recycled in the solvent and eventually recovered. Under such conditions, the over-all recovery could be expected to approach 98%.

Depending upon the number of stripping stages employed, the concentrations of the respective stripping solutions can range as indicated in Table 2. However, optimum results have been obtained by four stage stripping with 540 g./l. $H_2SO_4$ solution and by four stage stripping with 50 g./l. $Na_2CO_3$ solution, as indicated in the flow sheet of Fig. 4.

It can be readily seen that, without the process of this invention, which raises the stripping yield of thorium to almost 90% from the maximum yield of about 50% obtainable otherwise, recycling of the solvent would be impractical.

In the processing of uranium ores, it is common practice to extract uranium from a weak sulfuric acid leach solution by means of a solvent of the type presently specified. The uranium is stripped from the solvent with either a concentrated solution of hydrochloric acid or a solution of sodium carbonate. In some instances, trouble has been experienced with third phase formation during stripping, i.e. the forming of a stable emulsion which will not separate into a uranium-bearing phase and a solvent phase. To remedy such difficulty, tributyl phosphate has been added to the solvent in quantity of about 1% to 2% by volume of the latter.

Our process differs from this prior practice in that the tributyl phosphate is utilized to alter the properties of the solvent with respect to the stripping of thorium therefrom. While the extract solvent is preferably first stripped with hydrochloric acid in order to remove uranium and other impurities, stripping for the recovery of thorium is accomplished thereafter. Such stripping is accomplished in two steps, first, a partial recovery of thorium by means of sulfuric acid as the stripping solution, and, second, completion of thorium recovery by means of an alkali metal carbonate solution. In this way, a thorium product of purity comparable to spectroscopic standards is obtainable.

Inasmuch as thorium is retained in the uranium extract solutions which have been stripped of their uranium by the aforementioned prior art processes, recycling of the spent solvent means that the thorium content eventually builds up to such a point that the solvent must be discarded or regenerated in some way by elimination of thorium. The present process is ideally adapted for the recovery of thorium from such a thorium-loaded solvent, as an adjunct to the principal uranium-recovery operation.

As previously indicated, thorium can be extracted from hydrochloric acid solutions with HDPA over a wide range of acid concentrations. It can also be extracted from sulfuric acid, but with less favorable results. At a pH greater than 0 and less than 7, ferric iron is extracted along with other impurities, principally uranium and rare earths. With strong acid concentrations (pH0), most of the impurities, including iron, are left in the raffinate. For a high-purity product, however, the thorium-containing solvent is still washed with concentrated hydrochloric acid prior to stripping the thorium therefrom, so as to remove traces of impurities carried over into the solvent.

In order to test the applicability of the invention to mineral acid leach solutions in general, comparative tests were made in the laboratory on aliquots of a thorium-bearing solution prepared by leaching with sulphuric acid a sample of thorium ore from the Odegi region of Nigeria, Africa. Each aliquot was treated with ammonium hydroxide until basic. The hydroxide precipitate was filtered, washed, and subjected to the action of a sufficient quantiy of the particular mineral acid concerned to effect dissolution. The volume was then adjusted with distilled water until the volume of the sample equaled that of the aliquot. This procedure gave samples identical in thorium and impurity content and differing only in the kind of acid used. Thorium in these samples was extracted with equal volumes of 0.1 M HDPA solution containing 5% TBP, with the following results:

TABLE 4

*Extraction of thorium from various mineral acids*

| Type of Acid | Acid Concentration, g./l. | $ThO_2$, g./l. in heading | $ThO_2$, g./l. in Raffinate |
|---|---|---|---|
| $H_2SO_4$ | 200 | 2.89 | 1.85 |
| HCl | 200 | 2.89 | 0.06 |
| $HNO_3$ | 200 | 2.89 | 0.41 |
| $H_3PO_4$ | 100 | 2.89 | 2.29 |

From these tests it can be seen that extraction of thorium from nitric acid solutions can be readily accomplished. Extraction is not as good from nitric acid solutions as from hydrochloric acid solutions, but better than extraction from sulfuric acid solutions. Extraction from strong phosphoric acid solutions is relatively poor. This may be accounted for by the fact that thorium is precipitated as an insoluble phosphate.

Other organic phosphates and the like having similar chemical properties, for example, dibutylphosphate and low molecular weight alcohols, may be substituted for the specified tributyl phosphate additive with generally similar results. Also other inert diluents for the solvent may be used instead of kerosene.

Whereas this invention is here illustrated and described with respect to certain preferred practices, it should be understood that various modifications and variations may be resorted to by those skilled in the art without departing from the essential inventive concepts set forth herein and defined in the claims that here follow.

We claim:

1. A process for recovering high purity thorium oxide from thorium-bearing ore materials, comprising leaching such an ore material with a mineral acid; forming an impure thorium extract solution by subjecting the acid leach solution to the solvent action of an alkyl phosphate solution containing about 5% by weight of an organic phosphate selected from the group consisting of dibutyl phosphate and tributyl phosphate; stripping impurities from said extract solution by hydrochloric acid; partially stripping thorium from said extract solution by sulfuric acid, and completing the stripping of thorium from said extract solution by an alkali carbonate solution; mixing the thorium-bearing stripping solutions and adjusting the pH thereof for thorium oxalate precipitation; treating the resulting, purified, thorium-bearing solution with oxalic acid and heat to form a thorium oxalate slurry; recovering the thorium oxalate from said slurry; and calcining said thorium oxalate to form thorium oxide.

2. The process of claim 1, wherein the leaching acid is hydrochloric.

3. The process of claim 2, wherein the alkyl phosphate is selected from the group consisting of monoheptadecylorthophosphoric acid, 2,6,8-trimethylnonylorthophosphoric acid-2-monotridecyclorthophosphoric acid, and 5-ethylnonylorthophosphoric acid-2.

4. A process for recovering a high purity thorium solution from thorium-bearing ore materials, comprising leaching such an ore material with a mineral acid; forming an impure thorium extract solution by subjecting the acid leach solution to the solvent action of an alkyl phosphate solution containing about 5% by weight of an organic phosphate selected from the group consisting of dibutyl phosphate and tributyl phosphate; stripping impurities from said extract solution by hydrochloric acid; partially stripping thorium from said extract solution by sulfuric acid, and completing the stripping of thorium from said extract solution by an alkali carbonate solution; and consolidating the two thorium-bearing stripping solutions.

5. A liquid-liquid, solvent extraction process of recovering thorium from a thorium-bearing, mineral acid solution, comprising extracting thorium from said acid solution by subjecting the latter to the solvent action of an alkyl phosphate solution containing about 5% by weight of an organic phosphate selected from the group consisting of dibutyl phosphate and tributyl phosphate; partially stripping thorium from said extract solution by sulfuric acid; and completing the stripping of thorium from said extract solution by an alkali carbonate solution.

6. The process of claim 5, wherein the alkyl phosphate is selected from the group consisting of monoheptadecylorthophosphoric acid, 2,6,8-trimethylnonylorthophosphoric acid-2-monotridecylorthophosphoric acid, and 5-ethylnonylorthophosphoric acid-2.

7. The process of claim 5, wherein is included the step of stripping impurities from the extract solution by hydrochloric acid prior to the stripping of thorium therefrom.

8. In a liquid-liquid, solvent extraction process, wherein a thorium-bearing, alkyl phosphate solvent, extract solution is derived, the process of stripping thorium from said extract solution, comprising adjusting organic phosphate content (selected from the group consisting of dibutyl phosphate and tributyl phosphate) of said extract solution to about 5% by weight; partially stripping thorium from said extract solution by sulfuric acid; and completing the stripping of thorium from said extract solution by an alkali carbonate solution.

9. A process for recovering thorium oxide from thorium-bearing ore materials, comprising leaching such an ore material with a mineral acid; forming an impure thorium extract solution by subjecting the acid leach solution to the solvent action of an alkyl phosphate solution containing about 5% by weight of an organic phosphate selected from the group consisting of dibutyl phosphate and tributyl phosphate; stripping impurities from said extract solution by hydrochloric acid; partially stripping thorium from said extract solution by sulfuric acid; completing the stripping of thorium from said extract solution by an alkali carbonate solution; and combining the two thorium-bearing stripping solutions for the subsequent recovery of thorium oxide.

10. The process of claim 9, wherein the leaching acid is hydrochloric.

11. The process of claim 10, wherein the alkyl phosphate is selected from the group consisting of monoheptadecylorthophosphoric acid, 2,6,8-trimethylnonylorthophosphoric acid-2-monotridecylorthophosphoric acid, and 5-ethylnonylorthophosphoric acid-2.

References Cited in the file of this patent

UNITED STATES PATENTS 2,796,320    Spedding et al.  ---------- June 18, 1957

OTHER REFERENCES

AEC Document ISC–415, declassification date February 26, 1957, pages 54–60, 65.